United States Patent [19]

Vachon

[11] Patent Number: 4,579,179
[45] Date of Patent: Apr. 1, 1986

[54] ROW CROP CULTIVATOR

[75] Inventor: Bertrand Vachon, Thetford Mines, Canada

[73] Assignee: Ber Vac Inc., Thetford Mines, Canada

[21] Appl. No.: 590,268

[22] Filed: Mar. 16, 1984

[51] Int. Cl.$^4$ .................... A01B 39/08; A01B 39/14
[52] U.S. Cl. .................... 172/395; 172/673; 172/776; 172/624.5
[58] Field of Search .................... 172/395, 624.5, 310, 172/624, 673, 423, 429, 669, 776; 280/43, 43.22, 43.17

[56] References Cited

U.S. PATENT DOCUMENTS

| | | | |
|---|---|---|---|
| 1,740,841 | 12/1929 | Smith | 172/395 X |
| 2,899,776 | 8/1959 | Arnold | 172/624.5 |
| 3,029,879 | 4/1962 | Wells | 172/395 X |
| 3,327,786 | 6/1967 | Meyer | 172/624.5 |
| 3,508,618 | 4/1970 | Walberg | 172/253 |
| 3,840,076 | 10/1974 | Capehart | 172/26 |
| 4,210,340 | 7/1980 | White | 280/43.17 |
| 4,377,979 | 3/1983 | Peterson | 172/624.5 |
| 4,461,355 | 7/1984 | Peterson | 172/624.5 |

FOREIGN PATENT DOCUMENTS 710209 6/1954 United Kingdom .

*Primary Examiner*—Richard J. Johnson
*Attorney, Agent, or Firm*—Robic, Robic & Associates

[57] ABSTRACT

An improved cultivator having support wheels swingably and adjustably mounted under its frame to easily adjust the depth of the cultivating elements. The improved cultivator also has support bars arranged in pairs and carrying cultivating elements thereon. The bars in each pair extend in opposite directions and are connected to the frame by a single wedge having a pair of comming surfaces acting on both bars simultaneously. This wedge can be loosened to easily, slidably, adjust the support bars. The improved cultivator may also comprise a pair of wedge members connected by a bolt for quickly and easily connecting a cultivating element to an end of the support bars.

7 Claims, 4 Drawing Figures

ROW CROP CULTIVATOR

The present invention relates to an improved cultivator.

The invention more particularly relates to an improved row crop cultivator having means thereon whereby the operating conditions of the cultivator can be quickly adjusted.

It is often desirable, in operating a cultivator, to change the depth to which the cultivator works the soil, or to change the spacing between the cultivator elements, or to change or replace the cultivator elements employed. The above changes are often most desirably made in the field. However to make the above changes on known cultivators is quite labourious and often such changes cannot be easily made in the field.

It is the object of the present invention to provide an improved cultivator on which changes in the operating conditions of the cultivator, can be quickly and easily made.

More particularly, it is one specific object of the present invention to provide a cultivator having means whereby the depth to which the cultivator works the soil can be quickly and easily adjusted by adjusting the height of the support wheels on the cultivator, relative to the cultivator implements.

It is another specific object of the present invention to provide a cultivator having means whereby the distance between the adjacent cultivating elements can be quickly and easily adjusted.

It is a further specific object of the present invention to provide a cultivator having means whereby the cultivating elements can be quickly and easily replaced.

The cultivator of the present invention has a plurality of support wheels mounted beneath support members carrying the cultivator elements. Each support wheel is swingably mounted from the support member by a first strut. A second strut extending from the wheel at angle with respect to the first strut is adjustably mounted on the support member to adjust the height of the wheel. A spring-loaded locking pin may be used on the support member to lock the second strut in place. The locking pin is readily accessibly and quickly releases the second strut for height adjustment of the wheel.

The cultivator of the present invention may also have its cultivating elements mounted on support bars which are slidably mounted in the support members. The support bars are arranged in pairs with one bar of the pair extending in one direction transversely from the support member, and the other bar of the pair extending transversely in the opposite direction from the support member. In the support member, the bars of each pair are adjacent and parallel to each other. Simple wedge means are provided for simultaneously locking both bars of each pair in place in the support member. These wedge means comprise bolts which extend between the bars, and a nut threaded onto each bolt with a cam surface thereon to force the bars tight against the support member. Loosening of the nut allows the bars to be slidably adjusted in the support member thereby changing the spacing between the cultivating elements carried by the support bars.

The cultivating elements mounted on each support bar are connected by a support arm to the end of the support bar. The support bar is hollow and has an open end. Wedge means are provided for insertion into the open end of the support bar. A bolt connects the support arm carrying the disc to the wedge means. When the bolt is tightened, it locks the wedge means within the support bar thereby securely connecting the disc to the support bar. The loosening of a single bolt is all that is required to remove or replace the cultivating disc.

The invention is particularly directed toward a cultivator having at least one support member carrying one or more cultivating elements, at least one wheel supporting each support member on the ground and means for vertically adjusting each wheel with respect to the support member. These adjusting means comprise a first strut swingably connecting the wheel to the support member and a second strut extending at angle with respect to the first one for adjustably connects the wheel to the support member.

The invention is also directed toward a cultivator having at least one support member and at least one pair of support bars slidably mounted on the support member. One support bar of each pair extends in one direction transversely from the support member and the other support bar of each pair extends in the opposite direction transversely from the support bar. Cultivating elements are mounted on the support bars. Single means are provided on the support member to lock both bars of each pair to the support member.

The invention is further directed toward a cultivator having at least one support member and support bars mounted on the support member. Each support bar is hollow with an open end. A cultivating element is provided for each support bar along with means for detachably mounting each cultivating element to a support bar at its open end.

The invention will be better understood with reference to the following, non-restrictive description of a prefered embodiment thereof, made in connection with the accompanying drawings in which.

Figure 1:
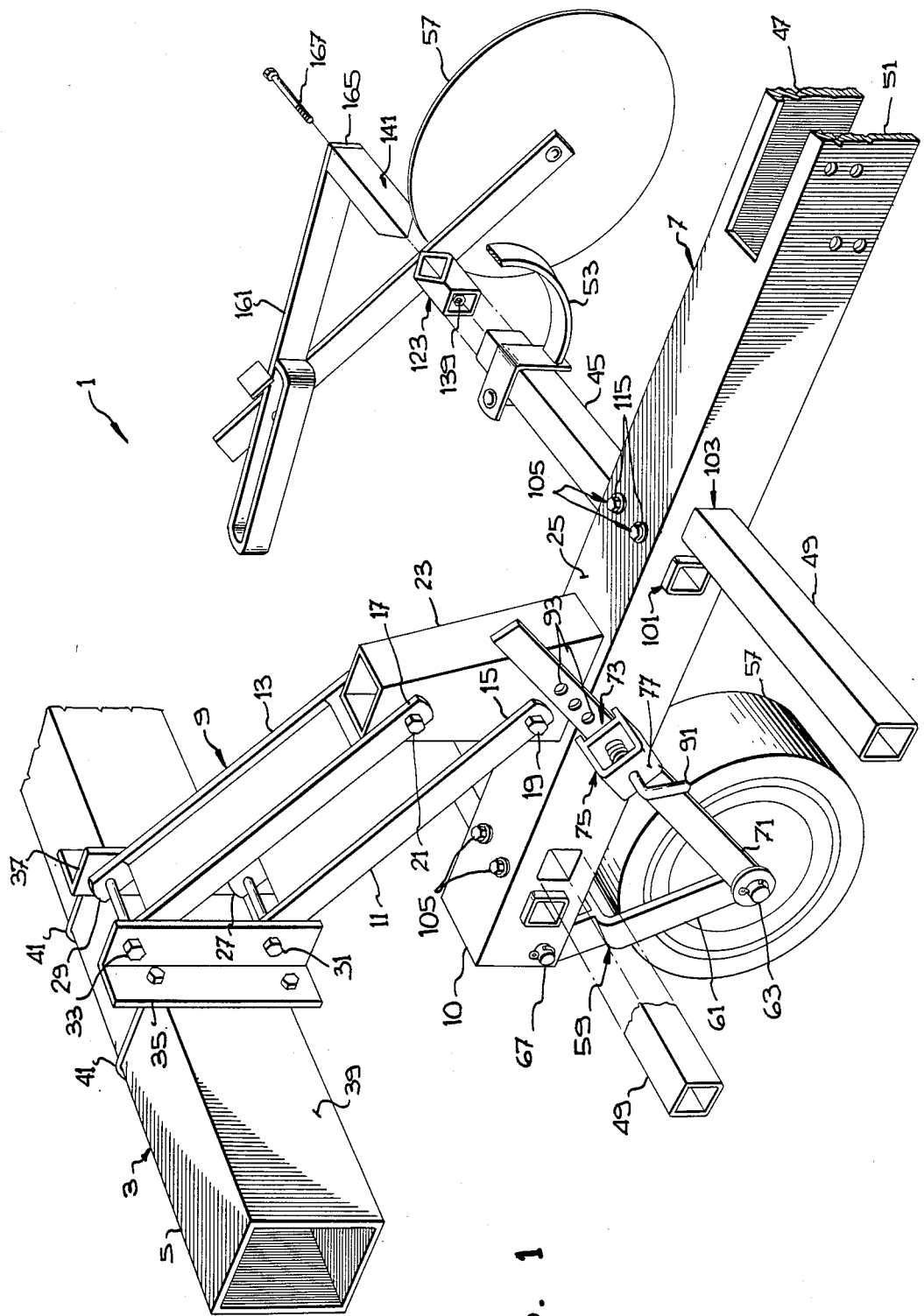
FIG. 1 is a detail, partly exploded, perspective view of a cultivator incorporating the improvements of the present invention.

The cultivator 1 as shown in FIG. 1, includes a main frame 3 by means of which the cultivator can be pulled by a tractor (not shown). The main frame 3 includes a rear main frame member 5 extending transverse to the direction of movement of the cultivator when it is pulled. A plurality of support members 7, one of which is shown, extend rearwardly from the rear main frame member 5. Each support member 7 extends transverse to the frame member 5 and is located beneath the same.

A parallelogram linkage 9 connects the support member 7, near its front end 10, to the frame member 5. The linkage 9 comprises two parallel arms 11 and 13. One end 15, 17 of each arm 11, 13 respectively is pivotally mounted by a bolt 19, 21 respectively to a mounting post 23 on the top wall 25 of the support member 7 near its front end 10. The other end 27, 29 of each arm 11, 13, respectively, is pivotally mounted by a bolt 31, 33, respectively, to a pair of brackets 35, 37. The brackets 35, 37 are each fixed to the back wall 39 of the rear main frame member 5 by U-bolts 41.

Each support member 7 carries a plurality of first support bars 45 which extend transversely from one side wall 47 of the support member 7, and a plurality of second support bars 49 which extend transversely from the other side wall 51 of the support member 7. Each bar 45 is located adjacent a bar 49 to form spaced-apart pairs of oppositely extending bars along each support member 7. Each support bar 45 or 49 carries known cultivating elements such as a cultivating tine 53 and a disk 55.

Each support member 7 is supported on the ground by a number of wheels 57 one of which is shown.

Figure 4:
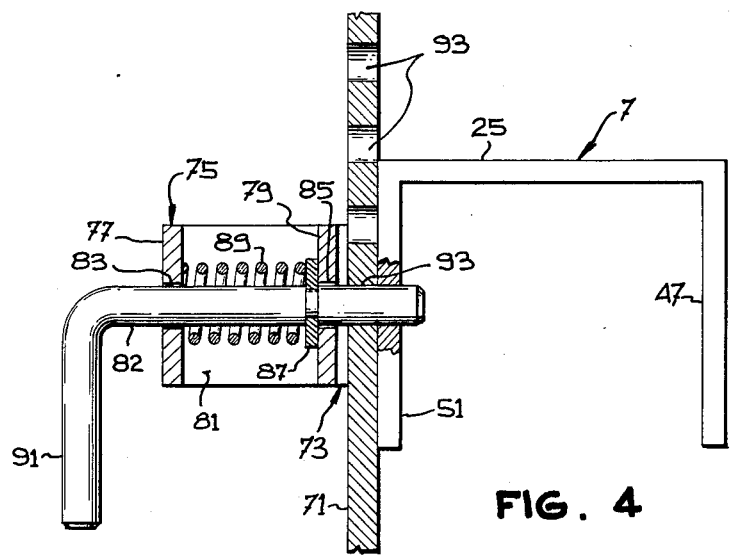
FIG. 4 is a cross-sectional, detail view showing how the support member is supported by an adjustable wheel.

In accordance with the present invention, each wheel 57 is mounted beneath the support member 7 in such a manner that it can be quickly, vertically adjusted with respect to the member 7. To do so, a first strut 59 is mounted over the wheel 57 with its arms 61 rotatably mounting the wheel 57 by its axle 63. The stem 65 of the strut 59 extends forwardly and upwardly between the side walls 47 and 51 of the frame member 7, and is pivotally mounted between the walls 47 and 51 by a pivot pin 67. The strut 59 normally trails the pin 67. A second strut 71 is mounted on the wheel axle 63 adjacent one of the arms 61 of the first strut 59 and extends upwardly and rearwardly to the frame member 7 to which it is fixed to prevent the wheel 57 from hitting the frame member 7. The rear strut 71 is adjustably mounted to the frame member 7 so that the height of the member 7 above the wheel 57 and thus above the ground can be adjusted. The rear strut 71 loosely passes through a slot 73 formed between the side wall 51 of member 7 and a lock pin mount 75. The lock pin mount 75 as shown in FIG. 4, has an outer end wall 77 and a parallel, inner end wall 79 defining the other side of slot 73. Side walls 81 connect the end walls 77 and 79 together and project past the end wall 79 to abut on the side wall 51 of the member 7 to which they are fixed.

A lock pin 82 extends through aligned holes 83, 85 in the end walls 77, 79. A stop washer 87 is fixed to the pin 82 between the end walls 77, 79. A spring 89 is mounted on pin 82 between the washer 87 and the outer end wall 77 to bias the pin inwardly against the side wall 51 of the member 7. A handle 91 on the outer end of the lock pin 82 allows the pin to draw away from the side wall 51.

The rear strut 71 has a plurality of spaced-apart holws 93 along its upper portion. The strut 71 is positioned to have one of the holes 93 aligned with the pin 82, the pin 82 passing into the aligned hole to lock the strut in place. The height of wheel 57 relative to member 7 is easily adjusted by moving the pin 82 outwardly via its handle 91, and sliding the rear strut 71 up or down through the slot 73 to locate the wheel at the desired height. The strut 71 is then slightly moved to align the nearest hole 93 with the pin 82 and the handle 91 is released, thus allowing the spring 89 to move the pin 82 into the hole 93.

The above mentioned, support bars 45 and 49 are adjustably mounted in the support member 7. Each bar 45 is slidably mounted in a pair of aligned holes 101 in the side walls 47 and 51 of member 7. Each bar 49 is also slidably mounted in a pair of aligned holes 103 in the side walls 47 and 51 of member 7. The holes 101 for each bar 45 are close to the holes 103 for each bar 49, and the holes 101 and 103 are aligned horizontally. When each bar 45 is slidably mounted in its holes 101, it lies parallel to, and closely adjacent a bar 49 slidably mounted in holes 103.

Simple means are provided to lock the bars 45 and 49 in the member 7. A single locking means 105 is provided for each pair of adjacent bars 45 and 49. The locking means 105 comprise at least one wedging member movable up between the bars 45 and 47 to wedge them upwardly and outwardly tight against the upper edges 107 and 109 of the ends of the holes 101 and 103.

Figure 2:
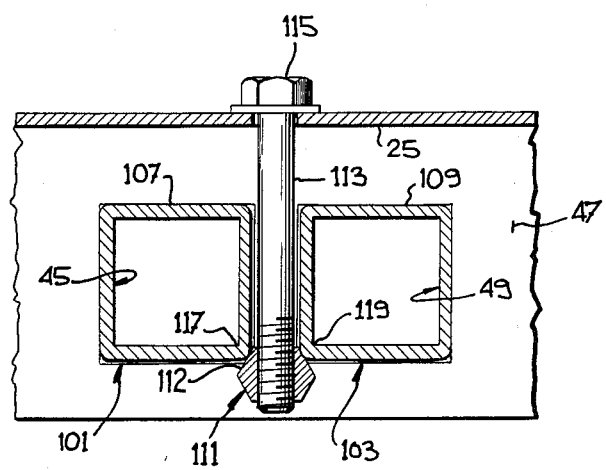
FIG. 2 is a cross-sectioneal view showing how the cultivator support bars are mounted to a support member.

The wedge member as shown in FIG. 2 comprises a nut 111 having a sloping surface 112. The nut 111 is threaded onto a bolt 113 that extends down from the top wall 25 of the member 7 between the bars 45 and 49. The head 115 of the bolt 113 rests on the top wall 25. The nut 111 threads onto the bolt 113 and its sloping cam surface 112 moves between the lower adjacent corners 117 and 119 of the bars 45 and 49. Continued threading of the nut 111 onto the bolt 113 causes the nut 111 to cam the bars 45 and 49 up and out and tight against the edges 107 and 109 of the holes 101 and 103.

Preferably, each single locking means 105 comprises two bolt and nut sets between each set of bars 45 and 49 as shown in FIG. 1. The support bars 45 and 49 can be easily adjusted relative to the support member 7 to vary the distance of the cultivator tines 53 and disks 57 carried by the bars 45 and 49 from the member 7. The adjustment is made by loosening the nuts 111, sliding the bars 45 and 49 the desired distance in the holes 101 and 103 and then retightening the nuts 111.

Figure 3:
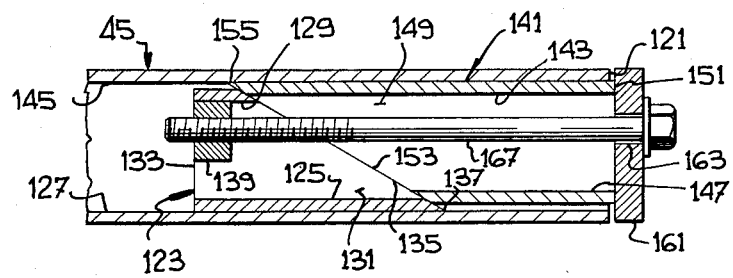
FIG. 3 is a cross-sectional view showing how a cultivator disc arm is mounted on a support bar.

Means are provided for easily mounting the disc 57 or any other cultivating element on the end of each support bar 45 or 49. Each support bar 45, 49 is hollow and has an open end 121. Preferably each tubular bar 45, 49 has a square cross-section. The disc mounting means as shown in FIG. 3 comprises a first wedge member 123 which loosely fits within the support bar through its open outer end 121. The first wedge member 123 can be tubular with a bottom wall 125 which bears on the bottom wall 127 of the support bar, a parallel top wall 129 and side walls 131. The inner end 133 of the member 123 is perpendicular to the bottom wall 125. The outer end 135 slopes rearwardly and upwardly from the front edge 137 of the bottom wall 125. A nut 139 is fixed within the member 123 to the top wall 129 adjacent the inner end 133.

The disc mounting means includes a second wedge member 141 which also loosely fits within the tubular support bar through its open end 121. The second wedge member 141 is also tubular with a top wall 143, which will bear against the top wall 145 of the support bar, a parallel bottom wall 147, and side walls 149. The outer end 151 of the second wedge member 141 is perpendicular to the top wall 143. The inner end 153, slopes forwardly and downwardly from the rear edge 155 of the top wall 143.

The arm 161 supporting the disc 57 has a hole 163 adjacent its free end 165. A bolt 167 is provided which passes through the hole 163 and thread onto the nut 139.

The disc mounting means is assembled by placing the outer end 135 of the first wedge member 123 against the inner end 153 of the second wedge member 141 and passing the bolt 167 through the hole 163 in arm 161, through the second wedge member 141, and into the nut 139. The assembled wedge members 123 and 141 are then placed into the support bar through its open end 121 with the bottom walls 125 and 147 of both wedge members 123 and 141 on the bottom wall 127 of the bar and with the arm 161 lying adjacent the open end 121 of the bar. The bolt 167 is now tightened drawing the first wedge member 123 toward the arm 161. As the wedge member 123 moves toward the arm 163, its inner end 153 cams the other wedge member 141 upwardly. Continued tightening of the bolt 167 cams the first wedge member 123 tight against the bottom wall 127, and the second wedge member 141 tight against the top wall 145. This securely locks the arm 161, and thus the disc 57 or another cultivating element to the end 121 of the support bar. The disc 57 is easily replaced by loosening the bolt 167.

I claim:

1. An improved cultivator of the type comprising:
   at least one support member having two sidewalls joined by a top wall;
   at least one wheel supporting each support member on the ground;
   means for vertically adjusting each wheel with respect to the support member, said adjusting means comprising a first strut swingably connecting the wheel to the support member, and a second strut extending at angle with respect to the first strut, for adjustably connecting the wheel to the support member;
   at least one pair of support bars mounted on the support member, one support bar of each pair extending in one direction transversely from the support member, the other support bar of each pair extending in the opposite direction transversely from the support member; and
   a set of cultivating elements mounted on the support bars, wherein:
   each pair of support bars are slidably mounted into two pairs of horizontally aligned, adjacent holes provided in the one and other side walls of the support member respectively, the support bars of said pair lying closely adjacent, and parallel to, each other in said pairs of holes in said support member, and
   single means are provided on said support member for locking both bars of each pair to the support member said locking means comprising wedge means for wedging the support bars tight against the support member, said wedge means comprising at least one bolt mounted in the top wall of the support member and passing down between the support bars, and a nut with a camming surface thereon threadable on the bolt, the camming surface on said nut wedging the bars apart into said respective holes and tight against the support member.

2. This improved cultivator as claimed in claim 1 further comprising a guide slot on the support member through which the second strut loosely slides, and means for locking the second strut in one of several positions in the guide slot.

3. The improved cultivator as claimed in claim 2, wherein the locking means for the second strut comprise a spring-loaded locking pin mounted adjacent the guide slot, and a plurality of spaced-apart holes at least in the second strut, said pin being movable into the guide slot and into one of the holes on the second strut to lock the strut.

4. The improved cultivator as claimed in claim 1, wherein each support bar is hollow and has an open end and wherein means are provided for detachably mounting each cultivating element to a support bar, said mounting means comprising other wedge means insertable into the support bar from its open end, means connecting the cultivating element to said other wedge means, and means for operating said other wedge means to lock it in place within the support bar.

5. The improved cultivator as claimed in claim 4, wherein the means connecting the cultivating element to the support bar, and the means for operating the wedge means, comprise the same component.

6. The improved cultivator as claimed in claim 5, wherein the wedge means comprise a first member having a contact surface and a cam surface, and a second member having a contact surface and a cam surface, the contact surface of the first wedge member contacting one inner wall of the support bar, the contact surface of the second wedge member contacting the inner wall opposite the one inner wall of the support bar, and the cam surface of the first wedge member contacting the cam surface of the second wedge member.

7. The improved cultivator as claimed in claim 6, wherein the component comprises a bolt threadably connecting the cultivating element to one of the wedge members, the other wedge member being loosely mounted on the bolt between the one wedge member and the cultivating element.

* * * * *